US012590914B2

(12) United States Patent
Jung et al.

(10) Patent No.: US 12,590,914 B2
(45) Date of Patent: Mar. 31, 2026

(54) METHOD FOR ANALYZING CONTENT OF D-LACTIC REPEATING UNITS IN POLYLACTIC ACID

(71) Applicant: LG CHEM, LTD., Seoul (KR)

(72) Inventors: Hyunchul Jung, Daejeon (KR); Jun Ho Yoon, Daejeon (KR); Wan Kyu Oh, Daejeon (KR); Yujin An, Daejeon (KR)

(73) Assignee: LG CHEM, LTD., Seoul (KR)

( * ) Notice: Subject to any disclaimer, the term of this patent is extended or adjusted under 35 U.S.C. 154(b) by 801 days.

(21) Appl. No.: 17/926,717

(22) PCT Filed: Nov. 29, 2021

(86) PCT No.: PCT/KR2021/017713
§ 371 (c)(1),
(2) Date: Nov. 21, 2022

(87) PCT Pub. No.: WO2022/220365
PCT Pub. Date: Oct. 20, 2022

(65) Prior Publication Data
US 2023/0204529 A1    Jun. 29, 2023

(30) Foreign Application Priority Data
Apr. 16, 2021    (KR) ........................ 10-2021-0050041

(51) Int. Cl.
*C08G 63/08*        (2006.01)
*G01N 24/08*        (2006.01)
(52) U.S. Cl.
CPC ........... *G01N 24/087* (2013.01); *C08G 63/08* (2013.01)
(58) Field of Classification Search
CPC .. G01N 24/087; G01N 24/08; G01R 33/4625; C08G 63/08
USPC .......................................................... 436/85
See application file for complete search history.

(56) References Cited

U.S. PATENT DOCUMENTS

| | | |
|---|---|---|
| 2010/0249331 A1 | 9/2010 | Babcock |
| 2010/0261843 A1 | 10/2010 | Kameo et al. |
| 2011/0319588 A1 | 12/2011 | Coupin et al. |
| 2013/0178598 A1 | 7/2013 | Kishida et al. |
| 2015/0284516 A1 | 10/2015 | Sohn et al. |
| 2017/0137442 A1 | 5/2017 | Mehrkhodavandi et al. |
| 2017/0315190 A1 | 11/2017 | Park et al. |
| 2018/0238795 A1 | 8/2018 | Gobius Du Sart et al. |
| 2018/0282599 A1 | 10/2018 | Schaekens et al. |

FOREIGN PATENT DOCUMENTS

| | | |
|---|---|---|
| CN | 101755010 A | 6/2010 |
| CN | 101835839 A | 9/2010 |
| CN | 104837889 A | 8/2015 |
| JP | H05-323006 | 12/1993 |
| JP | 2002-131255 | 5/2002 |
| JP | 3735767 | 1/2006 |
| JP | 2012001634 | 7/2012 |
| JP | 2012515245 | 7/2012 |
| JP | 2012144443 A | 8/2012 |
| JP | 2018-525630 | 9/2018 |
| JP | 6644878 | 2/2020 |
| KR | 10-2015-0071777 | 6/2015 |
| KR | 10-1996666 | 7/2019 |
| WO | 2008141265 A1 | 11/2008 |
| WO | 2014204269 A1 | 12/2014 |

OTHER PUBLICATIONS

Espartero, J. L. et al, Macromolecules 1996, 29, 3535-3539. (Year: 1996).*
Chisholm, M. H. et al, Macromolecules 1999, 32, 963-973. (Year: 1999).*
Zell, M. T. et al, Macromolecules 2002, 35, 7700-7707. (Year: 2002).*
He, P.-H. et al, Current Applied Physics 2007, 7S1, e63-e67. (Year: 2007).*
Suganuma, K. et al, Polymer Journal 2012, 44, 838-844. (Year: 2012).*
Cheng, "Computerized model fitting approach for the NMR analysis of polymers," Journal of Chemical Information and Computer Sciences, vol. 27, No. 1, Feb. 1987, pp. 8-13.
Suganuma et al., "NMR analysis and tacticity determination of poly(lactic acid) in $C_5D_5N$," Polymer Testing 38:35-39 (2014).
Thakur et al.," A Quantitative Method for Determination of Lactide Composition in Poly(lactide) Using $^1H$ NMR," Anal. Chem. 69:4303-4309 (1997).
Suganuma et al., "NMR Analysis of Poly(Lactic Acid) via Statistical Models," Polymers 11:725 (2019), 8 pages.
Chabot et al., "Configurational structures of lactic acid stereocopolymers as determined by $^{13}C$-$\{^1H\}$ n.m.r.," Polymer, 24:53-59 (1983).
Lee et al., "2.3.6: Quantification of D-Lactic Acid Content in Poly(Lactic Acid) (NatureWorks L.L.C., 2010a)," in Polylactic Acid: A Practical Guide for the Processing, Manufacturing, and Application of PLA, 2nd edition, William Andrew, Cambridge MA, 2019, pp. 80-81.

* cited by examiner

*Primary Examiner* — Arlen Soderquist
(74) *Attorney, Agent, or Firm* — Bryan Cave Leighton Paisner LLP

(57) ABSTRACT

Provided is a method for analyzing the content of D-lactic repeating units (D content) in polylactic acid that has a feature that the D content in polylactic acid can be quickly and accurately analyzed by using NMR data of polylactic acid and hypothetical polylactic acid without special chemical treatment for polylactic acid.

10 Claims, 2 Drawing Sheets

[FIG. 1]
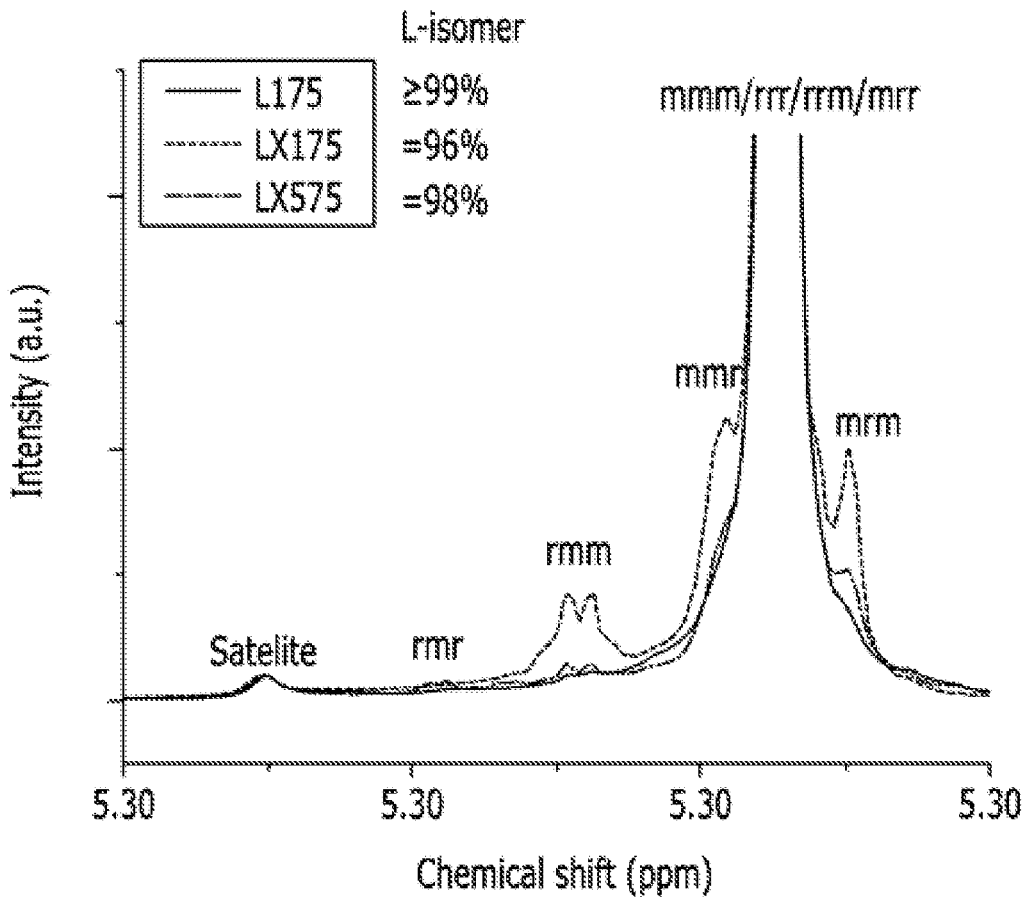

[FIG. 2]
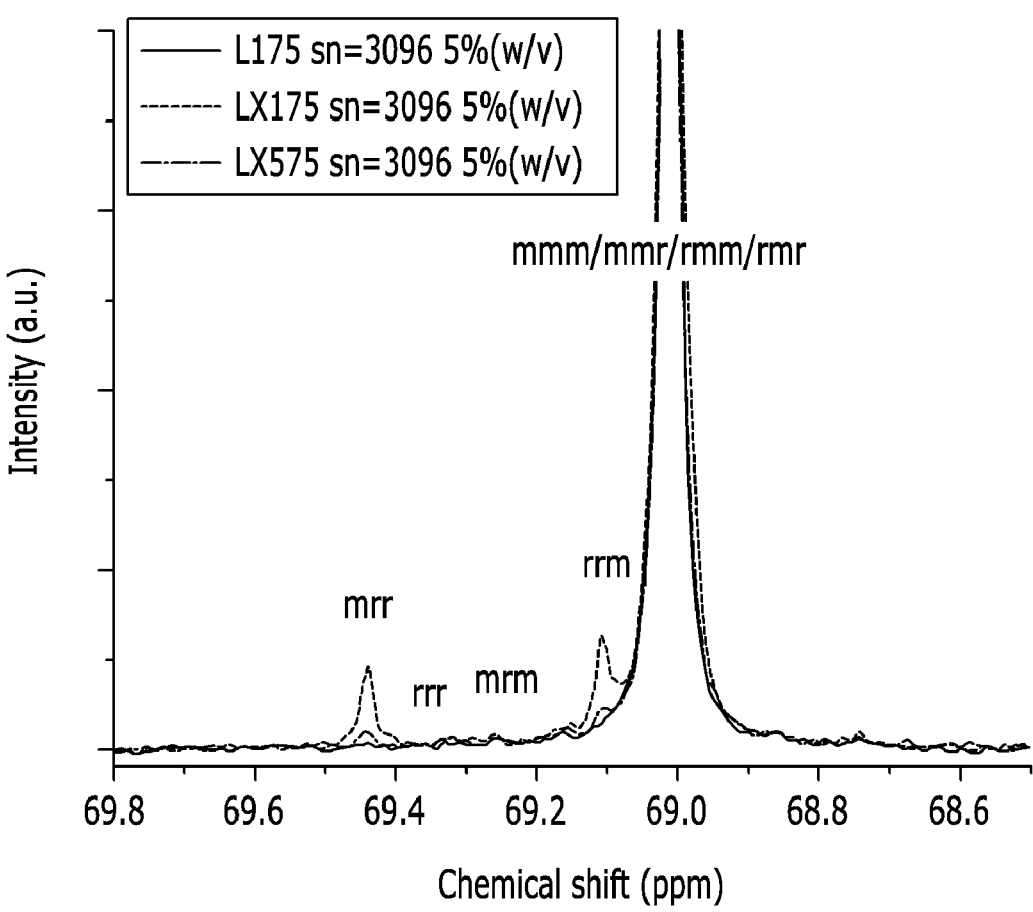

METHOD FOR ANALYZING CONTENT OF D-LACTIC REPEATING UNITS IN POLYLACTIC ACID

CROSS-REFERENCE TO RELATED APPLICATION(S)

This application a National Stage Application of International Application No. PCT/KR2021/017713 filed on Nov. 29, 2021, which claims the benefit of Korean Patent Application No. 10-2021-0050041 filed on Apr. 16, 2021 with the Korean Intellectual Property Office, the disclosure of which is incorporated herein by reference in its entirety.

TECHNICAL FIELD

The present disclosure relates to a method for analyzing the content of D-lactic repeating units in polylactic acid.

BACKGROUND ART

Polylactic acid is a material that has biodegradable properties and at the same time, has excellent mechanical properties such as tensile strength and elastic modulus, and is widely used in various fields. Polylactic acid is a homopolymer, but it can have various structures due to its tacticity. Polylactic acid is generally prepared through ring-opening polymerization of lactide. However, since lactide has optical isomers existed therein, the properties of polylactic acid can change depending on the arrangement of these optical isomers in the repeating units.

Particularly, since D-lactic acid repeating units in polylactic acid have a large influence on the properties of polylactic acid, the analysis of tacticity in polylactic acid is important. Conventionally, in order to analyze the content of D-lactic acid repeating units (hereinafter referred to as D content) in polylactic acid, polylactic acid was hydrolyzed and decomposed into individual monomers, which were analyzed by liquid chromatography (LC), or polylactic acid was hydrolyzed, decomposed into individual monomers and converted to alkyl lactate by an esterification reaction, which was then analyzed by gas chromatography (GC). However, the above methods are complicated in process and take a long time, and in particular, racemization can occur in the process of analysis, which can reduce the reliability of actual analysis data.

As another method, there is a method of analyzing polarimetry by dissolving polylactic acid in an organic solvent without decomposing polylactic acid, unlike the above methods. However, this method has a problem that the error increases depending on the concentration of polylactic acid in the organic solvent, and when impurities or additives having chirality are included, errors are likely to occur.

On the other hand, even in the case of polylactic acid having the same D content, the ratio of L-lactide, meso-lactide, and D-lactide in a raw material can vary, which causes a difference in the tacticity of polylactic acid and affects the physical properties. By conventional analysis methods such as the above method, it was difficult to confirm the difference in the ratio of the raw material.

Therefore, there is a need to develop a method for quickly and accurately analyzing the D content in polylactic acid and the relative ratios of L-lactide, meso-lactide, and D-lactide in the raw material, unlike the conventional method.

DETAILED DESCRIPTION OF THE INVENTION

Technical Problem

It is one object of the present disclosure to provide a method for quickly and accurately analyzing the D content in polylactic acid and the relative ratios of L-lactide, meso-lactide, and D-lactide in the raw material.

Technical Solution

In order to achieve the above object, according to the present disclosure, there is provided a method for analyzing the content of D-lactic acid repeating units (D content) in a polylactic acid, comprising the steps of:

1) obtaining quantitative data of tacticity from the NMR spectrum of polylactic acid;

2) obtaining the arrangement of a hypothetical polylactic acid with three parameters: a L-lactide ratio parameter, a meso-lactide ratio parameter, and a racemization parameter;

3) obtaining tacticity data of the hypothetical polylactic acid of step 2;

4) obtaining a standard deviation of the quantitative data of tacticity of step 1 and the quantitative data of tacticity of the hypothetical polylactic acid of step 3;

5) repeating steps 2 to 4 to obtain L-lactide ratio parameter, meso-lactide ratio parameter and racemization parameter in which the standard deviation of step 4 has been minimized; and 6) obtaining the D content in polylactic acid from the L-lactide ratio parameter, meso-lactide ratio parameter and racemization parameter obtained in step 5.

Polylactic acid is a polymer prepared by polymerization of lactide, and lactide can have a steric structure of L-lactide, meso-lactide, and D-lactide as follows. Therefore, the repeating units in polylactic acid can also have respective steric structures resulting therefrom. Since the steric structure affects the physical properties of polylactic acid, it is necessary to analyze the steric structure in polylactic acid.

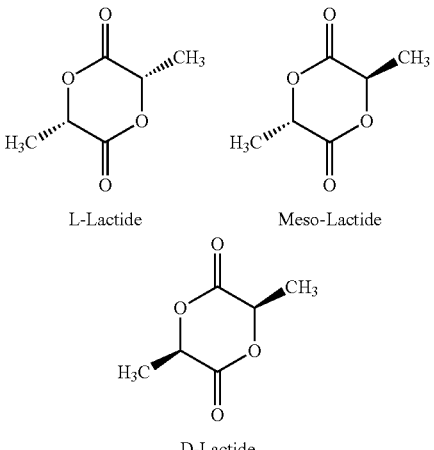

L-Lactide          Meso-Lactide

D-Lactide

On the other hand, a method for analyzing the tacticity of polylactic acid using NMR is known. Specifically, by analyzing the NMR spectrum of a polylactic acid, information concerning the arrangement of monomers in polylactic acid can be obtained. However, it is difficult to directly analyze therefrom how many D-lactic repeating units are present in polylactic acid. The reason is because the arrangement of two polylactic acids corresponds to each analyzed tacticity and thus, the content of D-lactic repeating units cannot be calculated.

In this regard, the method of the present disclosure is characterized by analyzing the content of D-lactic acid repeating units in polylactic acid and L-lactide, meso-lactide, and D-lactide in raw materials, by a method of obtaining tacticity information concerning the arrangement of hypothetical polylactic acid and then comparing two tacticities with each other, in addition to the tacticity information of polylactic acid using NMR.

Now, the present disclosure will be described in detail for each step.

(Step 1)

Step 1 of the present disclosure is a step of obtaining quantitative data of tacticity from the NMR spectrum of polylactic acid, which is a step of obtaining quantitative data of tacticity of polylactic acid to be actually analyzed.

Lactic acid repeating units present in polylactic acid include L-lactic acid repeating units and D-lactic acid repeating units, and different NMR peaks are obtained depending on their arrangement. From this point of view, the quantitative data of tacticity of step 1 means the tetrad intensity data of polylactic acid. Specifically, the NMR peak varies depending on the arrangement (tetrad) of four repeating units in polylactic acid, and in $^{13}$C NMR and $^1$H NMR, the following peaks can be obtained from a high chemical shift side to a low chemical shift as shown in Table 1 below (Polymers (2019), 11:725).

TABLE 1

| $^{13}$C NMR | mrr | rrr | mrm | rrm | mmm/mmr/ mmm/mnr |
| $^1$H NMR | rmr | rmm | mmr | mmm/rrr/ rrm/mrr | mrm |

In Table 1, 'm' means that the two repeating units are identical to each other, and 'r' means that the two repeating units are different from each other. In one example, the 'rmr' means that the arrangement of four repeating units in polylactic acid is 'LDDL' or 'DLLD'.

From these viewpoints, the NMR spectrum of step 1 means $^{13}$C NMR spectrum and $^1$H NMR spectrum of polylactic acid. Further, the integral intensity of each peak can be obtained as quantitative data of tacticity, and a total of 8 types of quantitative data can be obtained according to the arrangement (tetrad) of the 4 repeating units. In addition, for analysis, the ratio of each integral intensity to the total sum of the eight types of integral intensities can be obtained as the quantitative data.

(Step 2)

Step 2 of the present disclosure is a step of obtaining the arrangement of hypothetical polylactic acid. For this purpose, three parameters are arbitrarily set, one is the L-lactide ratio parameter, another is a meso-lactide ratio parameter, and yet another is a racemization parameter.

The 'L-lactide ratio parameter' refers to the generation probability of the (L-lactate)-(L-lactate) repeating unit (LL) when generating the lactic repeating unit. That is, the 'L-lactide ratio parameter' is '(probability of generating LL repeating unit)/(probability of generating LL repeating unit)+(probability of generating LD repeating unit)+(probability of generating DL repeating unit)+(probability of generating a DD repeating unit))'.

The 'meso-lactide ratio parameter' means the generation probability of (L-lactic)-(D-lactic) repeating unit (LD) and the generation probability of (D-lactic)-(L-lactic) repeating unit (DL) when generating lactic acid repeating units. That is, the 'meso-lactide ratio parameter' means '((probability of generating LD repeating unit)+(probability of generating DL repeating unit))/((probability of generating LL repeating unit)+(probability of generating LD repeating unit)+(probability of generating DL repeating unit)+(probability of generating DD repeating units))'

For example, if the 'L-lactide ratio parameter' is 0.90 and the 'meso-lactide ratio parameter' is 0.05, the probability of generating LL repeating unit is 0.90, the probability of generating an LD or DL repeating unit is 0.05, and the probability of generating DD repeating unit is 0.05 when generating lactate repeating units.

The (probability of generating LD repeating unit) and (probability of generating DL repeating unit) are considered to be not influencing for the purposes of the present disclosure. However, if necessary, a ratio between (probability of generating LD repeating unit) and (probability of generating DL repeating unit) can also be introduced as another parameter.

The 'racemization parameter' refers to a ratio at which L-lactic repeating unit (L) is changed to D-lactic repeating unit (D), and D-lactic repeating unit (D) to L-lactic repeating unit (L), with respect to an arbitrary repeating unit among all repeating units in the hypothetically generated polylactic acid. For example, if the 'racemization parameter' is 0.10, it means that the steric magnification is reversed with respect to arbitrary 10% of the total repeating units in the hypothetically generated polylactic acid.

Specifically, arbitrary L-lactide ratio parameter, meso-lactide ratio parameter and racemization parameter are set. According to the L-lactide ratio parameter and the meso-lactide parameter, LL arrangement meaning L-lactide, LD arrangement or DL arrangement meaning meso-lactide, and DD arrangement meaning D-lactide are arranged probabilistically according to the ratio of each parameter. Then, from the entire arrangement, the repeating units more by the number corresponding to the racemization parameter ratio were randomly selected, and the arrangement of hypothetical polylactic acid can be obtained by changing to D-lactic in the case of L-lactic and changing to L-lactic in the case of D-lactic.

On the other hand, the arrangement of hypothetical polylactic acid can have a repeating unit length of 10,000 to 1,000,000.

(Step 3)

Step 3 of the present disclosure is a step of obtaining tacticity data of the hypothetical polylactic acid of step 2.

Since the information about the arrangement of the hypothetical polylactic acid obtained in step 2 is known, the tacticity data of polylactic acid as in step 1 can be obtained therefrom. For example, when the arrangement of repeating units of the hypothetical polylactic acid obtained in step 2 is LLLDDLLLLL, the quantitative data can be obtained by counting LLLD, LLDD, LDDL, DDLL, DLLL, LLLL, and LLLL once each. Thereby, a total of 8 types of quantitative data can be obtained according to the arrangement (tetrad) of the 4 repeating units, as in step 1.

(Steps 4 and 5)

Step 4 of the present disclosure is a step of obtaining a standard deviation of the quantitative data of tacticity from the NMR spectrum of polylactic acid obtained in step 1, and the tacticity data of hypothetical polylactic acid obtained in step 3. Also, step 5 of the present disclosure is a step of repeating steps 2 to 4 by changing the L-lactide ratio parameter, meso-lactide ratio parameter and racemization parameter in order to obtain L-lactide ratio parameter, meso-lactide ratio parameter and racemization parameter in which the standard deviation of step 4 has been minimized.

Preferably, the standard deviation means the square root of the sum of squaring the difference between the corresponding eight types of quantitative data of the data in step 1 and the data in step 3. As the standard deviation is smaller, it can be assumed that the arrangement of the actual polylactic acid and the hypothetical polylactic acid is similar.

Preferably, the standard deviation is less than 0.05. More preferably, the standard deviation is less than 0.01, or less than 0.005. On the other hand, it should be understood that the minimization of the standard deviation is not necessarily the theoretically possible minimum value, but includes the case of less than 0.05.

(Step 6)

Step 6 of the present disclosure is a step of obtaining the D content in polylactic acid from the L-lactide ratio parameter, meso-lactide ratio parameter and racemization parameter obtained in step 5.

This is a step of obtaining the arrangement of hypothetical polylactic acid with the minimized standard deviation through step 5 and thus obtaining the D content in polylactic acid therefrom. At this time, since it can be assumed that the arrangement of actual polylactic acid and hypothetical polylactic acid is similar, the D content in hypothetical polylactic acid can be predicted as the D content in the actual polylactic acid.

On the other hand, since the arrangement of hypothetical polylactic acid is known through step 5, the D content can be easily calculated therefrom.

Advantageous Effects

As described above, the method for analyzing the content of D-lactic repeating units in polylactic acid has a feature that the D content in polylactic acid can be quickly and accurately analyzed by using NMR data of polylactic acid and hypothetical polylactic acid without special chemical treatment for polylactic acid.

BRIEF DESCRIPTION OF THE DRAWINGS

FIGS. 1 and 2 show NMR data of polylactic acid measured in Examples of the present disclosure.

DETAILED DESCRIPTION OF THE EMBODIMENTS

Hereinafter, embodiments of the present disclosure will be described in more detail by way of examples. However, the following examples are only provided for illustrative purposes, and the contents of the present disclosure are not limited by these examples.

EXAMPLE

The following five types of polylactic acid were used.
L175 (Total Corbion)
LX175 (Total Corbion)
LX575 (Total Corbion)
2003D (NatureWorks)
4032D (NatureWorks)

1) NMR Spectrum of Polylactic Acid $^{13}$C NMR and $^{1}$H NMR were measured for each polylactic acid, and the results are shown in FIGS. 1 and 2.

Further, the integral intensity shown in FIGS. 1 and 2 was analyzed, and the quantitative data of tacticity was obtained for each tetrad and shown in Table 2 below.

TABLE 2

| Type of tetrad | Lactic arrangement | L175 (%) | LX575 (%) | LX175 (%) | 4032D (%) | 2003D (%) |
|---|---|---|---|---|---|---|
| mmm | LLLL and DDDD | 97.28 | 92.10 | 83.94 | 93.99 | 87.08 |
| mrm | LLDD and DDLL | 0.11 | 1.37 | 1.44 | 1.79 | 0.55 |
| mmr | LLLD and DDDL | 0.22 | 0.54 | 0.75 | 1.11 | 2.25 |
| rmm | DLLL and LDDD | 1.24 | 0.54 | 1.62 | 0.55 | 4.57 |
| rmr | LDDL and DLLD | 0.65 | 0.43 | 0.31 | 0.68 | 3.02 |
| mrr | LDLL and DLDD | 0.03 | 1.42 | 5.32 | 0.65 | 1.19 |
| rrm | LLDL and DDLD | 0.45 | 3.19 | 5.77 | 1.14 | 1.11 |
| rrr | LDLD and DLDL | 0.02 | 0.41 | 0.84 | 0.09 | 0.23 |

2) Arrangement of Hypothetical Polylactic Acid

Arbitrary L-lactide ratio parameter, meso-lactide and racemization parameters were set for each of the three types of polylactic acid, and the length of the repeating unit was arranged so as to become 100,000. Specifically, the LL arrangement, the LD arrangement, the DL arrangement, and the DD arrangement were arranged according to the L-lactide ratio parameter and meso-lactide ratio parameter to obtain an arrangement of polylactic acid having a length of 100,000 repeating units. Then, from the entire arrangement, the arbitrary repeating units more by the number corresponding to the racemization parameter ratio was randomly selected, and changed to D-lactic in the case of L-Lactic, and to L-Lactic in the case of D-Lactic.

The tacticity arrangement was analyzed from the arrangement of hypothetical polylactic acid obtained respectively. This was analyzed according to the lactic arrangement in Table 2. By comparing each obtained quantitative data of tacticity with the data in Table 2, the L-lactide ratio parameter, meso-lactide ratio parameter, and racemization parameter were changed so that the standard deviation (the square root of the sum of squaring the differences between the 8 types of quantitative data) was minimized, and the arrangement of hypothetical polylactic acid was repeated.

The D-lactic unit content was calculated from the arrangement of hypothetical polylactic acid when the standard deviation has been minimized, and the results are shown in Table 3 below. At this time, the D-lactic unit content was calculated as the number of repeating units of D-lactic acid compared to the total number of repeating units of hypothetical polylactic acid.

TABLE 3

|  | L175 | LX575 | LX175 | 4032D | 2003D |
|---|---|---|---|---|---|
| D content(%) | 0.87 | 2.23 | 3.72 | 2.10 | 4.23 |
| L-lactide ratio parameter | 0.987 | 0.977 | 0.961 | 0.981 | 0.974 |
| meso-lactide ratio parameter | 0.008 | 0.017 | 0.039 | 0.004 | 0.003 |
| Racemization parameter | 0.00 | 0.008 | 0.018 | 0.004 | 0.018 |
| Standard deviation | 0.00349 | 0.00917 | 0.01811 | 0.00359 | 0.01138 |

As described above, the analysis method of the embodiment according to the present invention is simple since the chemical treatment for a sample is omitted, and it is highly stable because it does not use reagents and the like used for chemical treatment. In addition, since the arrangement of lactic units can be determined by analyzing the tacticity, there is an advantage in that it can be determined whether the contribution by Meso-Lactide is large or the contribution by D-Lactide is large even under the same D content.

Comparative Example 1

Hydrolysis and esterification were performed using the method presented in the article (Lee Tin Sin, Polylactic Acid: A Practical Guide for the Processing, Manufacturing, and Applications of PLA, Second Edition), and converted to methyl L-lactate and methyl D-lactate. The methyl D-lactate content in methyl lactate was analyzed to determine the D-lactic unit content in polylactic acid.

Specifically, a polylactic acid sample was dissolved in a potassium hydroxide-methanol solution under a heating condition of 65° C. Sulfuric acid was added to the above solution and heated under the same temperature. Deionized water and methylene chloride were added to the above solution and mixed, and then left to separate into two solution phases. The lower layer solution was collected and analyzed using Chiral GC-FID.

The results are shown in Table 4 below.

TABLE 4

|  | L175 | LX575 | LX175 | 4032D | 2003D |
|---|---|---|---|---|---|
| D content (%) by GC analysis | 0.37 | 1.56 | 3.71 | 1.46 | 4.16 |

Comparing the analysis method of Comparative Example 1 with the analysis method of Examples of the present disclosure described above, the analysis method of Comparative Example 1 has a drawback in that the analysis method is complicated because hydrolysis and esterification must proceed, and there is a problem in the safety of the analyst because sulfuric acid must be used. In addition, the analysis method of Examples of the present disclosure can determine the arrangement of lactic units by analyzing the tacticity, and therefore, it is possible to analyze whether the contribution by Meso-Lactide is large or the contribution by D-Lactide is large even under the same D content. On the other hand, in the method of Comparative Example 1, this analysis is difficult.

Comparative Example 2

The content of D-lactic acid in polylactic acid was calculated using a statistical model method using the paper (Polymers (2019), 11: 725).

Specifically, for the quantitative data of tacticity obtained as shown in Table 2, the values of each variable (p1, p2, f1) described in Table 3 of the paper were obtained using the search function of Excel. At this time, p1 means L/(L+D), p2 means LL/(LL+DD), and f2 means a variable in the 'Two-State' model of the paper.

The results are shown in Table 5 below, and for comparison, the results of Tables 3 and 4 are also described.

TABLE 5

|  | L175 | LX575 | LX175 | 4032D | 2003D |
|---|---|---|---|---|---|
| D content (%) by GC method | 0.37 | 1.56 | 3.71 | 1.46 | 4.16 |

TABLE 5-continued

|  | L175 | LX575 | LX175 | 4032D | 2003D |
|---|---|---|---|---|---|
| (*D content in Table 3) | 0.87 | 2.23 | 3.72 | 2.10 | 4.22 |
| D content (%) | 0.88 | 2.76 | 4.78 | 2.26 | 4.27 |
| p2 | 0.996 | 1 | 1 | 0.988 | 0.977 |
| p1 | 0.919 | 0.782 | 0.885 | 0.778 | 0.899 |
| f2 | 0.939 | 0.873 | 0.586 | 0.948 | 0.751 |
| Standard deviation | 0.00982 | 0.0230 | 0.0449 | 0.0094 | 0.0320 |

Comparing the analysis method of Comparative Example 2 with the analysis method of Examples of the present disclosure described above, it is possible to indirectly determine whether the D content is from Meso-Lactide or D-Lactide depending on whether the Single Addition Factor is high or the Pair Addition Factor is high, but it has the drawback of being difficult to show numerically. In addition, since the analysis method of Comparative Example 2 calculates the ratio for each tacticity based on the probability theory, the standard deviation is relatively large. Therefore, there is a disadvantage in that the accuracy is lowered in terms of quantifying the D content.

The invention claimed is:

1. A method for analyzing the content of D-lactic acid repeating units (D content) in a polylactic acid, comprising the steps of:
   1) Obtaining quantitative data of tacticity from an NMR spectrum of a polylactic acid;
   2) Obtaining the arrangement of a hypothetical polylactic acid with three parameters: a L-lactide ratio parameter, a meso-lactide ratio parameter and a racemization parameter;
   3) Obtaining tacticity data of the hypothetical polylactic acid of step 2;
   4) Obtaining a standard deviation of the quantitative data of tacticity of step 1 and the quantitative data of tacticity of the hypothetical polylactic acid of step 3;
   5) Repeating steps 2 to 4 to obtain the L-lactide ratio parameter, meso-lactide ratio parameter and racemization parameter in which the standard deviation of step 3-4 has been minimized; and
   6) Obtaining the D content in the polylactic acid from the L-lactide ratio parameter, meso-lactide ratio parameter and racemization parameter obtained in step 5.

2. The method according to claim 1, wherein:
   the quantitative data of tacticity in step 1 is an integral intensity data for a tetrad of the polylactic acid.

3. The method according to claim 1, wherein:
   the tetrad of the polylactic acid is mmm, mrm, mmr, rmm, rmr, mrr, rrm, and rrr.

4. The method according to claim 1, wherein:
   the NMR spectrum in step 1 is a 13C NMR spectrum and a 1H NMR spectrum of the polylactic acid.

5. The method according to claim 1, wherein:
   the L-lactide ratio parameter in step 2 is a generation probability of (L-lactic)-(L-lactic) repeating unit (LL) when generating lactic repeating units.

6. The method according to claim 1, wherein:
   the meso-lactide ratio parameter is a generation probability of (L-lactic)-(D-lactic) repeating unit (LD) and a generation probability of (D-lactic)-(L-lactic) repeating unit (DL) when generating lactic repeating units.

7. The method according to claim 1, wherein:
   the racemization parameter in step 2 is a ratio at which the L-lactic repeating unit (L) is changed to a D-lactic repeating unit (D), and the D-lactic repeating unit (D) to an L-lactic repeating unit (L), with respect to an arbitrary repeating unit among all repeating units in the hypothetically generated polylactic acid.

8. The method according to claim 1, wherein:
the tacticity data in step 3 is a quantitative data for the tetrad of the hypothetical polylactic acid in step 2.

9. The method according to claim 1, wherein:
the standard deviation in step 4 is a square root of the sum of squaring the difference between the corresponding eight types of quantitative data of the data of step 1 and the data of step 3.

10. The method according to claim 1, wherein:
the standard deviation of step 4 is less than 0.05.

\* \* \* \* \*